(12) United States Patent
Liu et al.

(10) Patent No.: US 10,698,789 B1
(45) Date of Patent: Jun. 30, 2020

(54) FUZZ TESTING FOR QUANTUM SDK

(71) Applicant: International Business Machines Corporation, Armonk, NY (US)

(72) Inventors: Peng Liu, Yorktown Heights, NY (US); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/210,939

(22) Filed: Dec. 5, 2018

(51) Int. Cl.
| | |
|---|---|
| *G06F 9/44* | (2018.01) |
| *G06F 11/36* | (2006.01) |
| *G06N 10/00* | (2019.01) |
| *G06F 8/30* | (2018.01) |
| *B82Y 10/00* | (2011.01) |

(52) U.S. Cl.
CPC .......... *G06F 11/3604* (2013.01); *G06F 8/31* (2013.01); *G06F 11/3664* (2013.01); *G06F 11/3684* (2013.01); *G06F 11/3688* (2013.01); *G06N 10/00* (2019.01); *B82Y 10/00* (2013.01)

(58) Field of Classification Search
CPC ..... H03K 3/38; G06T 15/005; G06F 17/5009; G06F 30/327; G06F 11/3604; B82Y 10/00; G06N 10/00
See application file for complete search history.

(56) References Cited

U.S. PATENT DOCUMENTS

| | | | |
|---|---|---|---|
| 7,875,876 B1 * | 1/2011 | Wandzura | B82Y 10/00 257/26 |
| 8,977,576 B2 | 3/2015 | Macready | |
| 9,026,574 B2 | 5/2015 | Macready et al. | |
| 9,864,954 B1 | 1/2018 | Jasionowski | |
| 10,333,503 B1 * | 6/2019 | Cohen | H03K 3/38 |
| 2008/0140749 A1 * | 6/2008 | Amato | G06N 10/00 708/490 |
| 2015/0205759 A1 | 7/2015 | Israel et al. | |
| 2016/0171368 A1 | 6/2016 | Aspuru-Gugile et al. | |
| 2018/0181685 A1 * | 6/2018 | Roetteler | G06F 30/327 |

(Continued)

FOREIGN PATENT DOCUMENTS

WO 2017152289 9/2017

OTHER PUBLICATIONS

Zhang, "QuMAsim: A quantum Architecture Simulation and Verification Platform", Delft Univ. of Technology, Aug. 2018, p. 1-55 <ZhangSimul.pdf>.*

(Continued)

*Primary Examiner* — Tuan A Vu
(74) *Attorney, Agent, or Firm* — Amin, Turocy & Watson, LLP

(57) ABSTRACT

The subject disclosure relates generally to an automated testing tool for quantum software development kits (SDKs). A system in accordance with an embodiment comprises a memory that stores computer-executable components. A processor is operably coupled to the memory and executes the computer-executable components stored in the memory. The computer-executed components comprises: a transformation component that receives a qasm program and transforms the qasm program; a testing component that tests the transformed qasm program on the SDK; and a reporting component that reports whether a quantum SDK has functioned properly or failed for the transformed qasm program.

20 Claims, 8 Drawing Sheets

(56) References Cited

U.S. PATENT DOCUMENTS

| | | | |
|---|---|---|---|
| 2019/0007051 A1* | 1/2019 | Sete | G06N 10/00 |
| 2019/0042392 A1* | 2/2019 | Matsuura | G06F 11/3604 |
| 2019/0042677 A1* | 2/2019 | Matsuura | G06F 17/5009 |
| 2019/0042974 A1* | 2/2019 | Daraeizadeh | G06T 15/005 |
| 2019/0156242 A1* | 5/2019 | Haener | G06N 10/00 |

OTHER PUBLICATIONS

Wang et al, "QuanFuzz: Fuzz Testing of Quantum Program", arXIV, Oct. 2018, Microsoft Research, Asia p. 1-5 <WangFuzz.pdf>.*

O'Gorman et al., "Compiling planning into quantum optimization problems: a comparative study," Proceedings of the Workshop on Constraint Satisfaction Techniques for Planning and Scheduling Problems, 2015, pp. 11-20, 10 pages.

Cross et al., "Open Quantum Assembly Language," arXiv:1707.03429v2 [quant-ph], Jul. 13, 2017, 24 pages.

* cited by examiner

FUZZ TESTING FOR QUANTUM SDK

TECHNICAL FIELD

The subject disclosure relates generally to an automated testing tool for quantum Software Development Kit (SDKs).

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate testing quantum SDK for quantum programs. As used herein, the terms Quantum SDK, Quantum SDK Server, SDK Server, and Software Development Kit Server shall be used interchangeably.

In accordance with an embodiment, a system comprises a memory that stores computer-executable components; a processor, operably coupled to the memory, that executes the computer-executable components stored in the memory, wherein the computer-executable components comprise: a transformation component that receives a qasm program and transforms the qasm program. A testing component tests the transformed qasm program upon the SDK, and a reporting component reports if the quantum SDK has functioned properly or failed for a specific transformed program.

In accordance with an embodiment a computer-implemented method, comprises receiving, by a device operatively coupled to a memory, a qasm program and transforming the qasm program; testing, by the device, the transformed qasm program on the SDK; and reporting, by the device, if the quantum SDK has functioned properly or failed for that specific transformed program.

In accordance with another embodiment, a computer program product, comprising a computer readable storage medium having program instructions embodied therewith, the program instructions executable by a processor to cause the processor to: receive, by a processor operatively coupled to a memory, a qasm program and transforming the qasm program; testing, by the processor, the transformed qasm program on the SDK; and reporting, by the processor, if the quantum SDK has functioned properly or failed for that specific transformed program.

DETAILED DESCRIPTION

Figure 1:
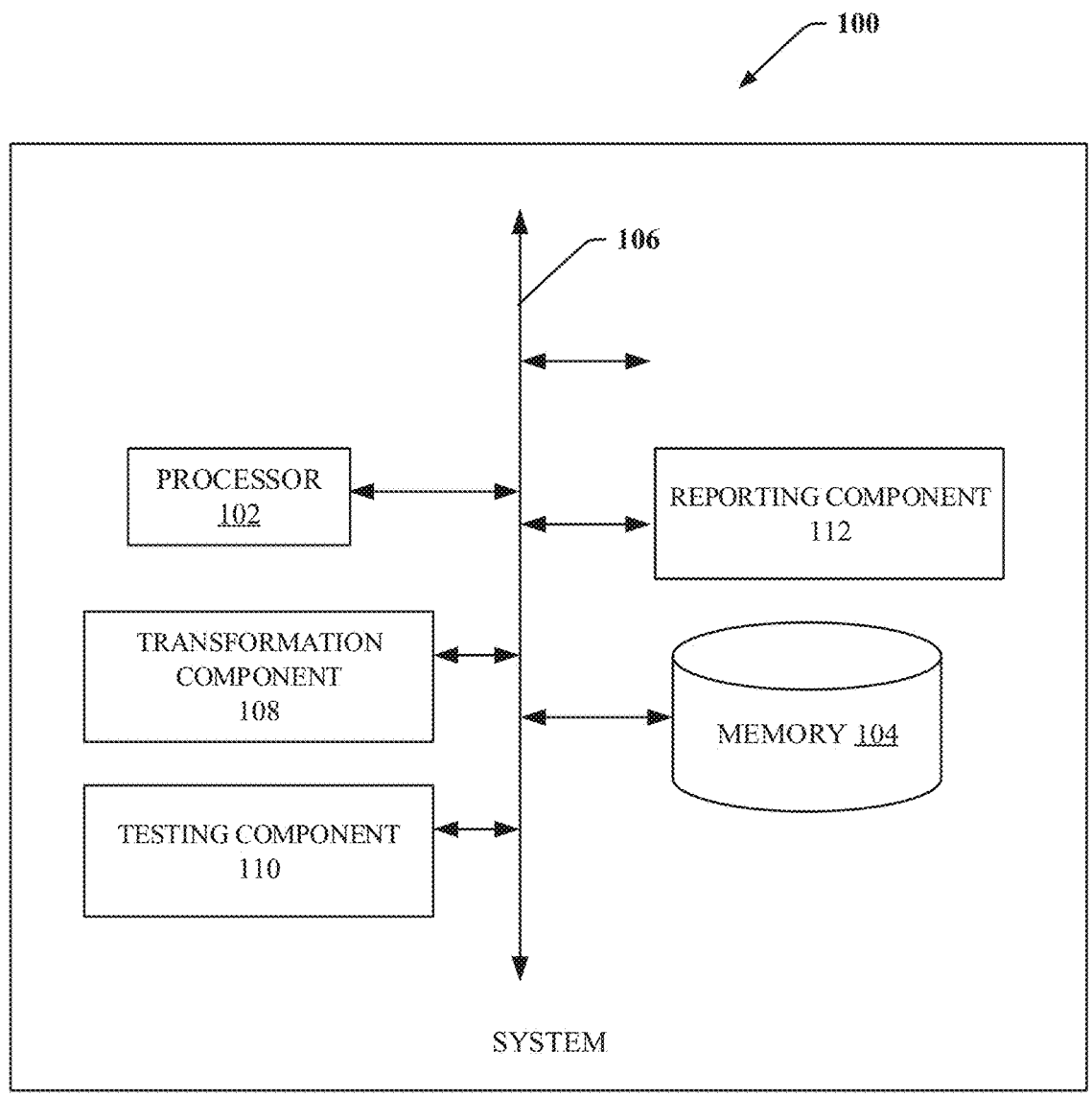
FIG. 1 illustrates a block diagram of an example system that can function as a fuzzy end to end tool to verify functionality of a quantum SDK in accordance with one or more embodiments described herein.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Quantum computing is generally the use of quantum-mechanical phenomena for purpose of performing computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits, and use interference. Superconducting qubits offer a promising path toward constructing fully-operational quantum computers. This is because they can exhibit quantum-mechanical behavior (e.g., allowing them to be used for quantum information processing) at the macroscopic level (e.g., allowing them to be designed and fabricated by existing integrated circuit technologies).

A quantum computation uses the qubit as its fundamental unit instead of the classical computing bit. The qubit (e.g., quantum binary digit) is the quantum-mechanical analogue of the classical bit. Whereas classical bits can take on only one of two basis states (e.g., 0 or 1), qubits can take on superpositions of those basis states (e.g., $a|0\rangle + \beta|1\rangle$), where $\alpha$ and $\beta$ are complex scalars such that $|\alpha|2 + |\beta|2 = 1$), allowing a number of qubits to theoretically hold exponentially more information than the same number of classical bits. Thus, quantum computers (e.g., computers that employ qubits instead of solely classical bits) can, in theory, quickly solve problems that would be extremely difficult for classical computers.

The bits of a classical computer are just binary digits, with a value of either 0 or 1. Almost any device with two distinct states can serve to represent a classical bit: a switch, a valve, a magnet, a coin. Qubits, which are the fundamental core of Quantum computing, can occupy a superposition of 0 and 1 states. It's not that the qubit can have an intermediate value, such as 0.63; when the state of the qubit is measured, the result is always 0 or 1. But in the course of a computation a qubit can act as if it were a mixture of states—say, 63 percent 0 and 37 percent 1.

General quantum programs require coordination of quantum and classical parts of the computation. One way to think about general quantum programs is to identify their processes and abstractions involved in specifying a quantum algorithm, transforming the algorithm into executable form, running an experiment or simulation, and analyzing the results. A key idea throughout these processes is the use of intermediate representations. An intermediate representation (IR) of a computation is neither its source language description, nor the target machine instructions, but something in between. Compilers may use several IRs during the process of translating and optimizing a program. The input is source code describing a quantum algorithm and any compile time parameters. The output is a combined quantum/classical program expressed using a high-level IR. An important distinction between quantum and classical computers is that a quantum computer is probabilistic, thus these measurements of algorithmic outputs only give the proper solution within an algorithm specific confidence interval. The computation is then repeated until satisfactory probable certainty of solution can be achieved.

The input for quantum computing can be a quantum/classical program which can be expressed in multiple ways. For this subject matter the quantum formatting language named QASM can be utilized. QASM is a simple text-format language for describing acyclic quantum circuits composed from single qubit, multiply controlled single-qubit gates, multiple-qubit, and multiple-qubit controlled multiple-qubit gates. Quantum Assembly Language (OpenQASM) is an intermediate representation for quantum instructions. There is currently a lack of programming languages for describing quantum computation on a practical scale, e.g., not just at a level of simple problems. Along with QASM, there is a language QML, a functional language for quantum computations on finite types. There is QCL (Quantum Computation Language) which is a high level, architecture independent programming language for quantum computers along with others.

OpenQASM represents universal physical circuits over the CNOT plus SU(2) basis with straight-line code that includes measurement, reset, fast feedback, and gate subroutines. Using this assembly language for quantum computing, software programs are typically developed and executed using a SDK (software development kit) and produce results expected from the core intention of the program if executed properly in the environment. A quantum SDK environment is used for parsing and executing quantum programs on a server. As in classical software programs, software bugs, data formatting, instructions out of sequence, a non-robust SDK, etc. can prevent the software program from even compiling or executing its code correctly and/or crash on the system/server its running on. Currently the quantum SDKs may not be tested thoroughly due to the lack of input quantum programs and crash on some quantum programs.

For classical software programs, capturing errors within the code itself before its final implementation can be conducted by what is referred to as "Fuzz testing". Fuzz testing (fuzzing) is a quality assurance technique used to discover coding errors and security loopholes in software, operating systems or networks. It involves inputting massive amounts of random data, called fuzz, to the test subject in an attempt to make it crash. If a vulnerability is found, a software tool called a fuzzer can be used to identify potential causes.

Embodiments provide for an automated fuzzy based end to end testing tool for quantum SDKs that can fuzzy test the SDK similar to classical programs. This end to end testing tool can receive a QASM program, modify it with mutating inputs which can transform the program and attempt to execute it through a target system (e.g., Quantum SDK running on a server) in an attempt to make the SDK crash. Embodiments can increase robustness and reliability of the SDK—results can indicate a form of success (e.g., based on the input coverage) or failure and potential root cause or items to investigate if the server crashes.

FIG. 1 illustrates a block diagram of an example system 100 that can access data and process that data using variable computing components depicted in accordance with one or more embodiments described herein. The system 100 can facilitate a process of assessing and identifying a large amount of various forms of data, and using machine learning, training a neural network or other type of model. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a transformation component 108 that receives the input QASM program which can be identified as P and transforms it by modifying the instructions, which can be identified by P'. A testing component 110 tests the P' program against the SDK server to validate SDK reliability and robustness. Then a reporting component 112 monitors the testing of the Fuzz testing upon the SDK server and reports if the SDK server functioned properly for that specific program.

The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, the memory 104 can store computer executable components executable by the processor 102. The transformation component 108 can modify the input QASM program in multiple ways based on the testing tool Fuzzing capabilities in an effort to send the most varied types of quantum programs to the SDK server. The testing component 110 can run multitudes of tests on the SDK to validate its capabilities using the Fuzz testing method. Fuzz testing is a software testing technique that employs random data given as the inputs to the system 100. If the application fails, then those issues/defects are to be addressed by the system (e.g., for the embodiments, the target test subject is the quantum SDK). The reporting component 112 can monitor the SDK for each specific Fuzz attack and verify its ability to run the program without errors in compiling, executing, memory, invalid instructional support from the SDK, etc., and provide data back to the tester on the pass/fail status of each test from each program. The SDK can be tested as thoroughly as the Fuzz testing tool can allow.

The various components of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Figure 2:
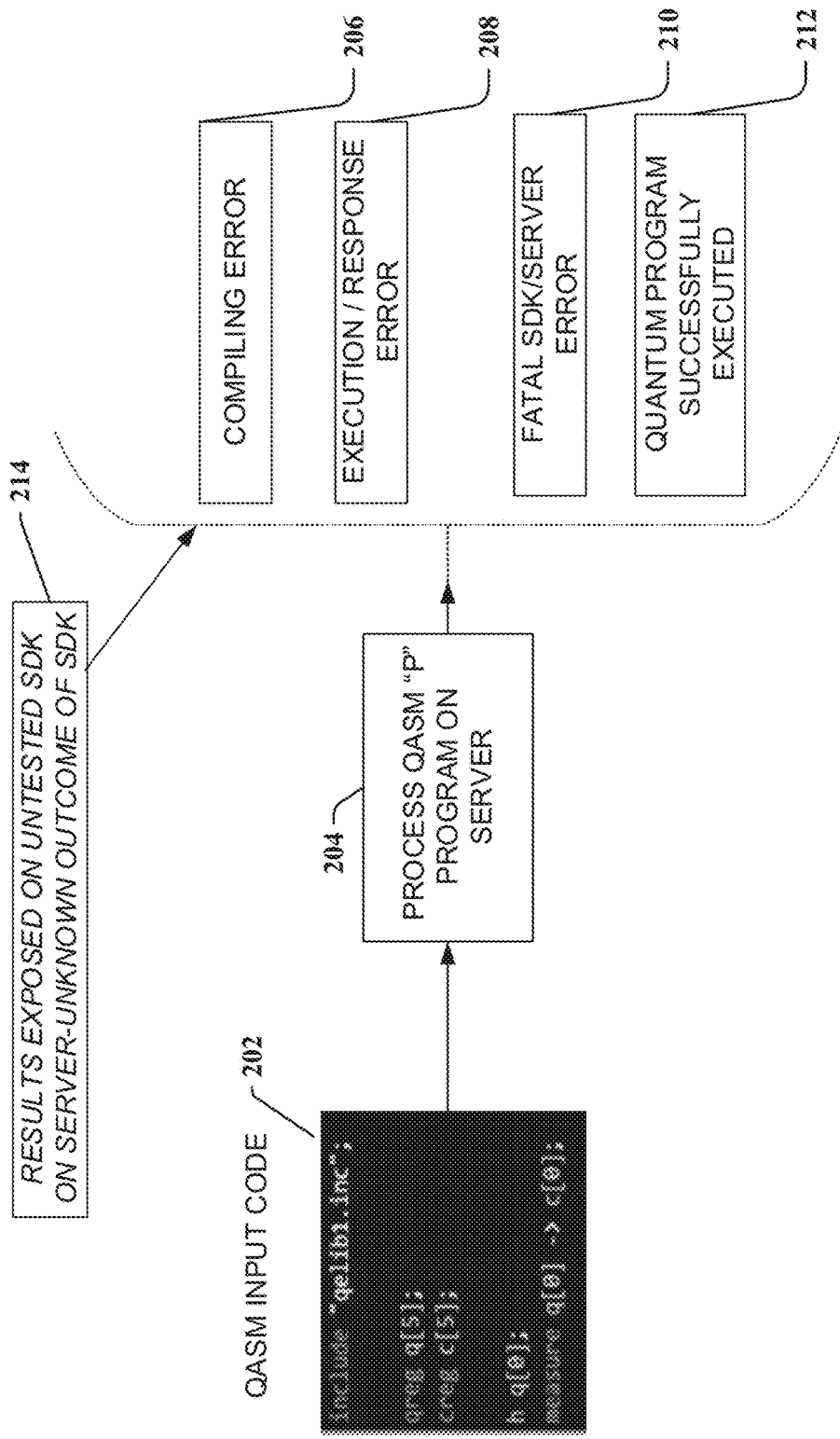
FIG. 2 illustrates a generic implementation and execution of a quantum program on a SDK server without utilizing a fuzz testing tool in accordance with one or more embodiments described herein.

FIG. 2 illustrates a generic implementation and execution of a quantum program on a SDK server without using a fuzz testing tool. As indicated on the diagram the impact of a corrupted program would be manifested upon the server leading the server to potentially crash. The embodiments core objective is to fuzz test the SDK for various vulnerabilities and attempt to crash it on the server to expose bugs, so in its final implementation, the SDK and its related hardware can be secure without negative impact. Block 202 represent the input QASM program in its untested form about to be executed on a server. As the QASM program, for example named "P starts its processing steps 204 on the server, specific errors in the code itself can lead to compiling errors 206, execution errors 208, possible serious errors 210 or possibly a successful execution. With the serious errors, there can be potentially severe ramifications such as crashing the server due to the program which the SDK could not support or execute. However, it should be noted that the outcome is unknown if the quantum program had been untested in this environment. In an effort to resolve this high-risk possibility, it becomes imperative to not just test the software, but to Fuzz test the Quantum SDK with mutating inputs. The Fuzz testing can offer the ability to identify bugs that can crash the server (target system) by attacking the server with modifications made to the program "P" which then transforms into the program P'. The QASM can be "Fuzzed" over and over to attack the SDK Server to verify the durability and capability of the SDK in handling and executing different types of quantum programs. Fuzzing offers a high benefit-to-cost ratio and can often reveal serious defects that are overlooked when software is written and debugged. It cannot provide a complete picture of the overall security, quality or effectiveness of a program, issues with the hardware it is running on, and is most effective when used in conjunction with extensive black box testing, beta testing and other proven debugging methods.

Figure 3:
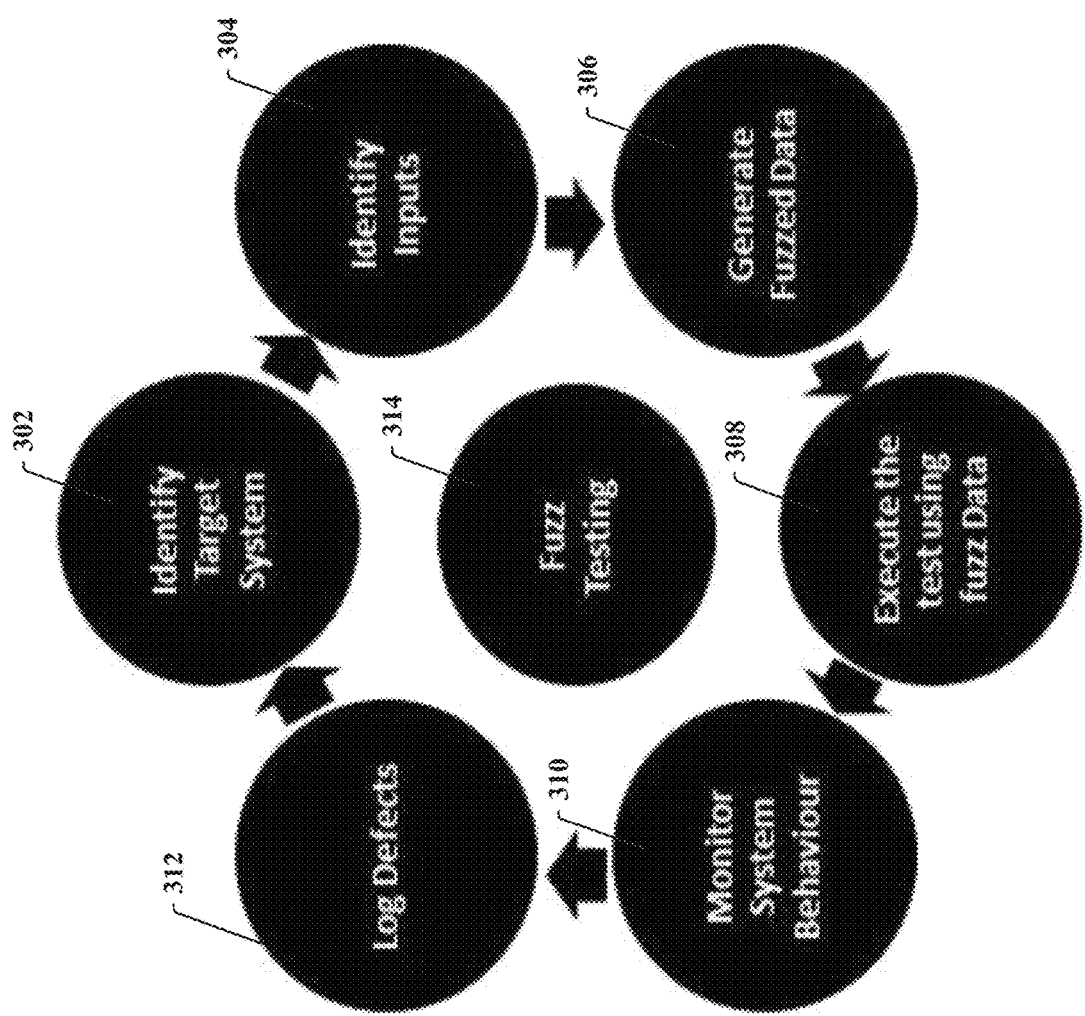
FIG. 3 illustrates the process of fuzz testing and its various stages in accordance with one or more embodiments described herein.

FIG. 3 illustrates the process of fuzz testing and its various stages. Fuzz testing is a type of testing where automated or semi-automated testing techniques are used to discover coding errors and security loopholes in software, operating systems, hardware, or networks by inputting invalid or random data called FUZZ to the system. After which the system is monitored for various exceptions, such as crashing down of the system or failing built-in code, etc. Fuzz testing or fuzzing is a software testing technique, and it is a type of security testing. The embodiments are based on an input mutation focused Fuzzer which alter existing input samples to create new test data. This process starts with valid samples of protocol and the Fuzzer keeps modifying or corrupting every byte or file which in itself changes the program. This transforms the original program to a secondary or transformed program in an attempt to crash the server running it. The steps for fuzz testing (314) include the following testing steps:

1) Identify the target system (302) (Quantum SDK);
2) Identify inputs (304);
3) Generate fuzzed data (306);
4) Execute the test using fuzz data (308);
5) Monitor system behavior (310);
6) Log defects (312).

This testing cycle is run as many times the Fuzzer is capable of and can find hundreds of compiling, software or processing bugs that would be exposed in real-world applications. It is to be noted as of this time there are not a significant number or quantum programs so many bugs may be residing in safety without fear of exposure.

Figure 4:
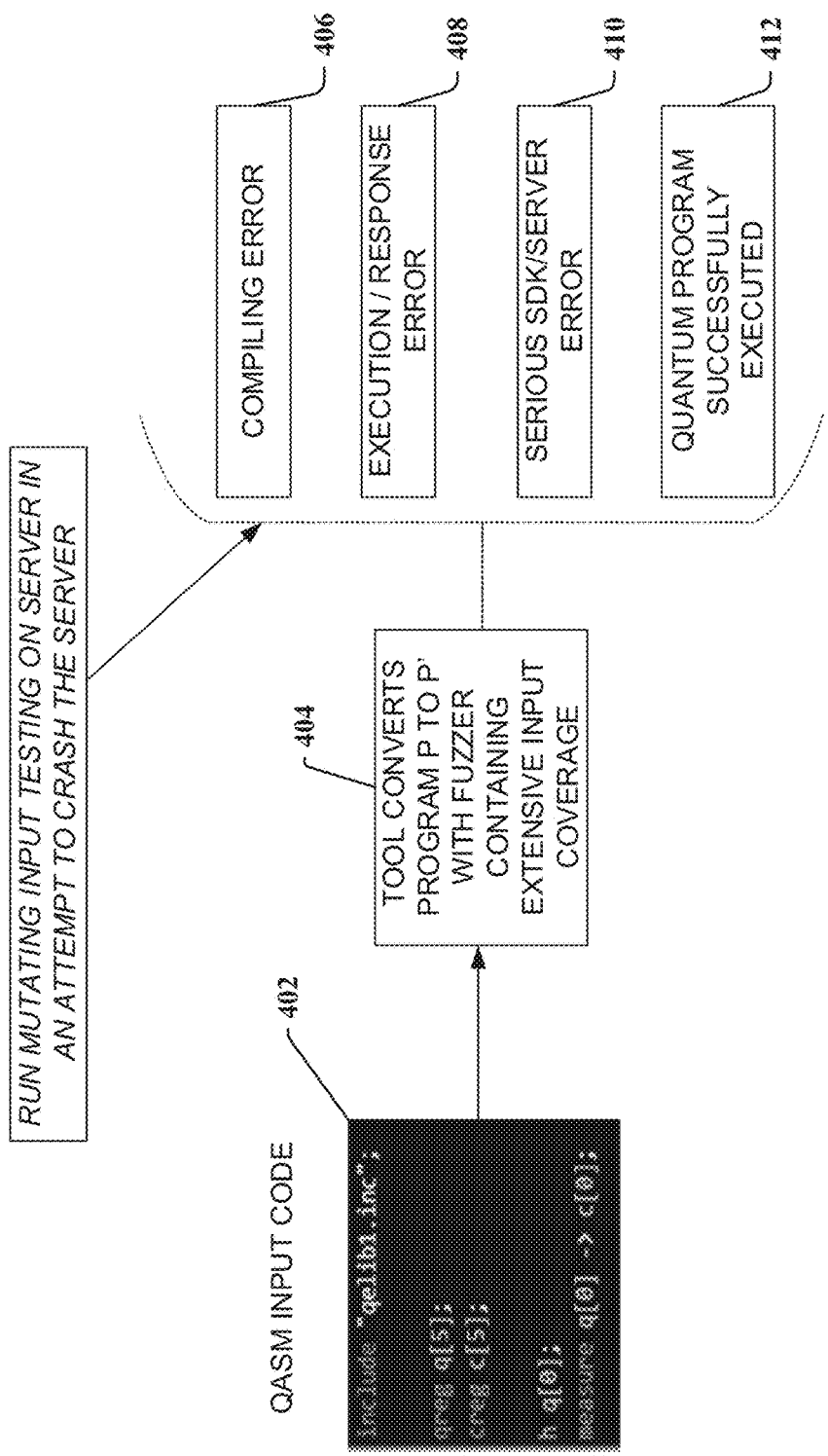
FIG. 4 illustrates a generic implementation of testing a quantum program on a SDK server utilizing a fuzzy testing tool in accordance with one or more embodiments described herein.

FIG. 4 illustrates a generic implementation of testing a quantum program on a SDK server utilizing a Fuzzy testing tool. As depicted in FIG. 2, the process of running the QASM program 402 is the same, except in this case the program is run through the automated testing tool 404. The Fuzz testing tool can receive this program, identified as P and modify and mutate the inputs, to convert it to program P' in an attempt to crash the program on the hardware its running on. Compiling error examples 406 such as: "Compiling Error on legal input program" may be detected and the error code presented for review. Execution errors examples 408 such as: "Execution/Response error from the Server Unexpected error: <type 'exceptions.KeyError'>NoneNone" may be detected and the error code presented for review. These are examples of the capability of the Fuzz testing tool providing its in-depth testing capability to capture bugs that would crash or paralyze a server or other hardware. There may be serious errors that the tool cannot fully identify and classify as an "undefined serious error" 410 that can require further testing to isolate. In many cases the program can execute without any compiling or processing errors on the SDK server and successfully complete its task 412, this would assume the program passed through the entire Fuzzing test without failure of the quantum program on the target SDK. It should be appreciated that this successful completion is only based upon the variation limitations of the Fuzz testing tool, unexpected mutating inputs that are not within the testing criteria would not be covered. This emphasizes the significance of a large coverage of mutating inputs in the tool for through comprehensive testing. Additional complementing testing can also be beneficial to this process.

Figure 5:
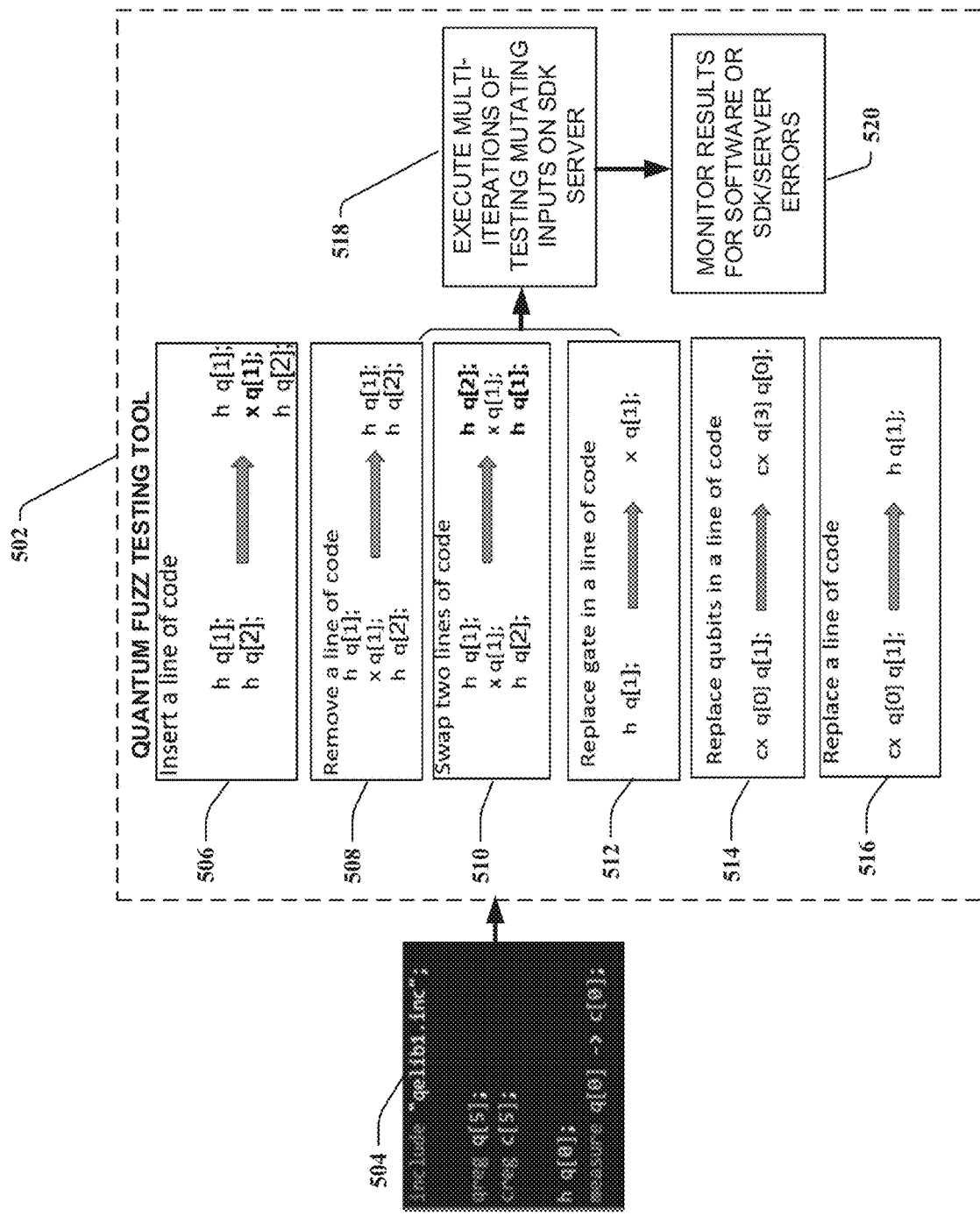
FIG. 5 illustrates the various technical capabilities of the Fuzzy testing tool, in accordance with one or more embodiments described herein.

FIG. 5 illustrates the various technical capabilities of the Fuzzy testing tool. The embodiments can take the input QASM program 504, as an example that program can be referred to as P, the tool transforms it to P' by utilizing one of the modifications indicated in (a-f) below, and sends P' to the quantum SDK server. This is an attempt to test and crash the server based on the modified program.

At a high level, the automatic transformation follows one of the following strategies:
  a. Insert a line of code;
  b. Remove a line of code;
  c. Swap two lines of code;
  d. Replace gate in a line of code;
  e. Replace qubits in a line of code;
  f. Replace a line of code.

Note the technical capabilities of the tool, in 506 the tool inserts a line of code as the instruction "x q[1];" is added in between instructions "h q[1];" and "h q[2];". This converted the original program P to P' by the insertion of the line of code. 508 represents another mutation option of removing a specified line of code in the program. In 508, the line of code identified as "x q[1];" is removed from the middle of the instructions "h q[1];" and "h q[2];". Each one of the modifications in the code from 506-516 represent a input mutation and can be used in an attempt to disable or otherwise cause the server to operate improperly. In 510, the two instructions "h q[1];" and "h q[2];" are swapped in order of instructions. Similarly, in 512 there is a gate in the line of code completely replaced by a different gate in the code, 514 reflects the replacement of qubits in a line of code and 516 reflects the complete replacement of an entire line of code. Each of these mutation options represents a program P transformed to P'. The transformations need to respect constraints within the testing such as, the gate should be consistent with the number of qubits (ex: "cx q[0]" is illegal since cx needs two qubits), the instruction can use only the declared qubits, otherwise this can lead to out-of-bound exceptions and the gate and Qubits should be chosen randomly.

Figure 6:
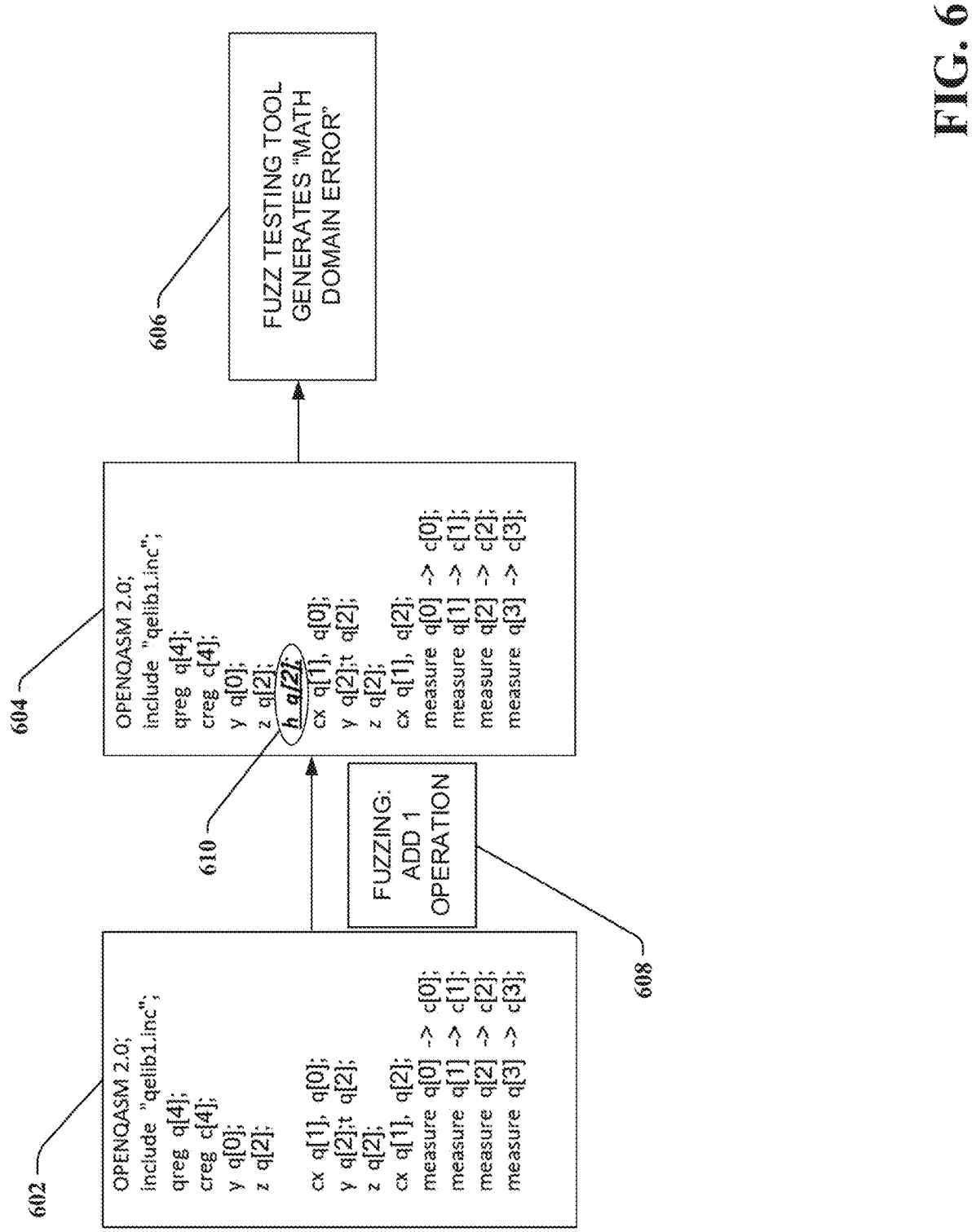
FIG. 6 illustrates a specific example of the Fuzzy tool functionality in accordance with one or more embodiments described herein.

FIG. 6 illustrates a specific example of the Fuzzy tool functionality and an example outcome. For this example, the original program identified as program "P" is referred to in 602. The fuzzy tool then modifies the program 608 by adding one operation 610 between the instructions z q[2]; and cx q[1],q[0]; transforming the program to P' 604. Notice all the other instructions and parameters are identical in both programs. As this program P' is run on the server, an error code is generated 606 which indicates this program cannot be run successfully on the server. For this example, the error code generated is "Math Domain Error". It is significant to understand this is an example and any of the mutating input options the tool provides can be utilized anywhere in the program. This implies that any of the available input options below can be used anywhere in the program.
  a. Insert a line of code;
  b. Remove a line of code;
  c. Swap two lines of code;
  d. Replace gate in a line of code;
  e. Replace qubits in a line of code;
  f. Replace a line of code.

Fuzzy testing doesn't prove that no bugs exist. However, passing a fuzz test greatly improves your confidence that an application and/or target system is robust and secure against unexpected input.

Figure 7:
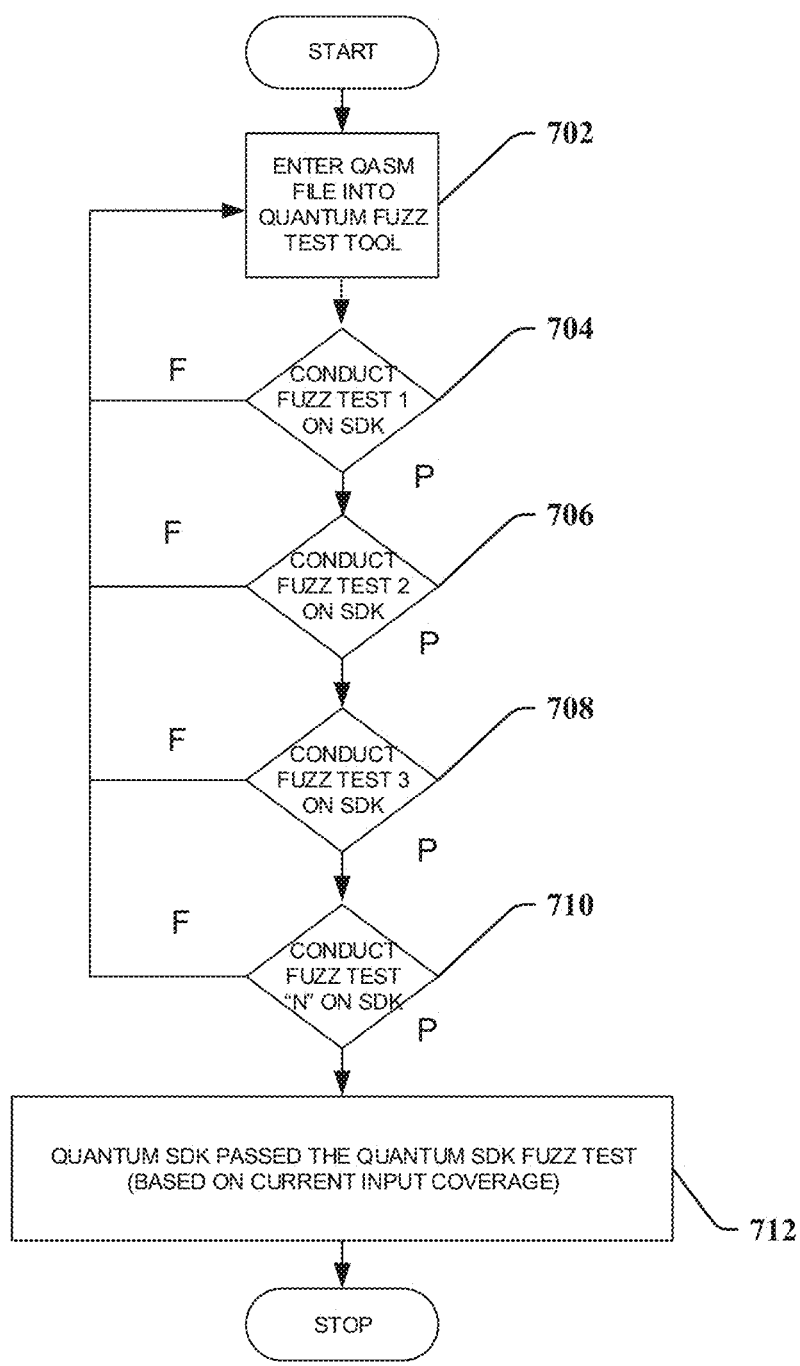
FIG. 7 illustrates a process flowchart of the Fuzzy testing tool for testing Quantum SDKs in accordance with one or more embodiments described herein.

FIG. 7 illustrates a process flowchart of the Fuzz testing tool for Quantum SDKs. The process starts with the original program 702 which the fuzz testing tool can receive and modify repeatedly with mutating inputs in an attempt to crash/freeze or lockout the server (any detrimental impact). As the flow chart implies the fuzzy tool can drive tremendous amounts or mutating inputs (fuzzed data) using this program as the source. The target system can be the server and each test can imply various changes to the program that can be run upon the target system. Block 704 represents an example of one test fuzz test (test 1) which could be any variation of the program run on the server to evaluate the results. The fuzz tester can apply variation of tests, this is an example at blocks 706 and 708. If the SDK passes one test, such as at 704, the fuzzer can test alternative mutating changes (706 and 708) to gauge impact. If the program crashes the server, then the SDK can be considered as failing the test and would need to be modified and properly addressed before executing it on a real-world application. The fuzzer would conduct as many tests as feasible based on the capabilities of the tool (this is the implication of block 710) where "N" represents the theoretical conclusion of the testing after all the testing the fuzzer can conduct is completed. The testing tool can provide up front validation of the quantum SDK similar to a fuzzing tool that for a classical program. If the SDK has passed the interrogation of the quantum fuzzing tool, then it can be considered safe (712) to run variations of quantum programs with mitigated risk. This result does not imply any program can execute correctly on any hardware, this is specific to the hardware the tool is testing on.

Figure 8:
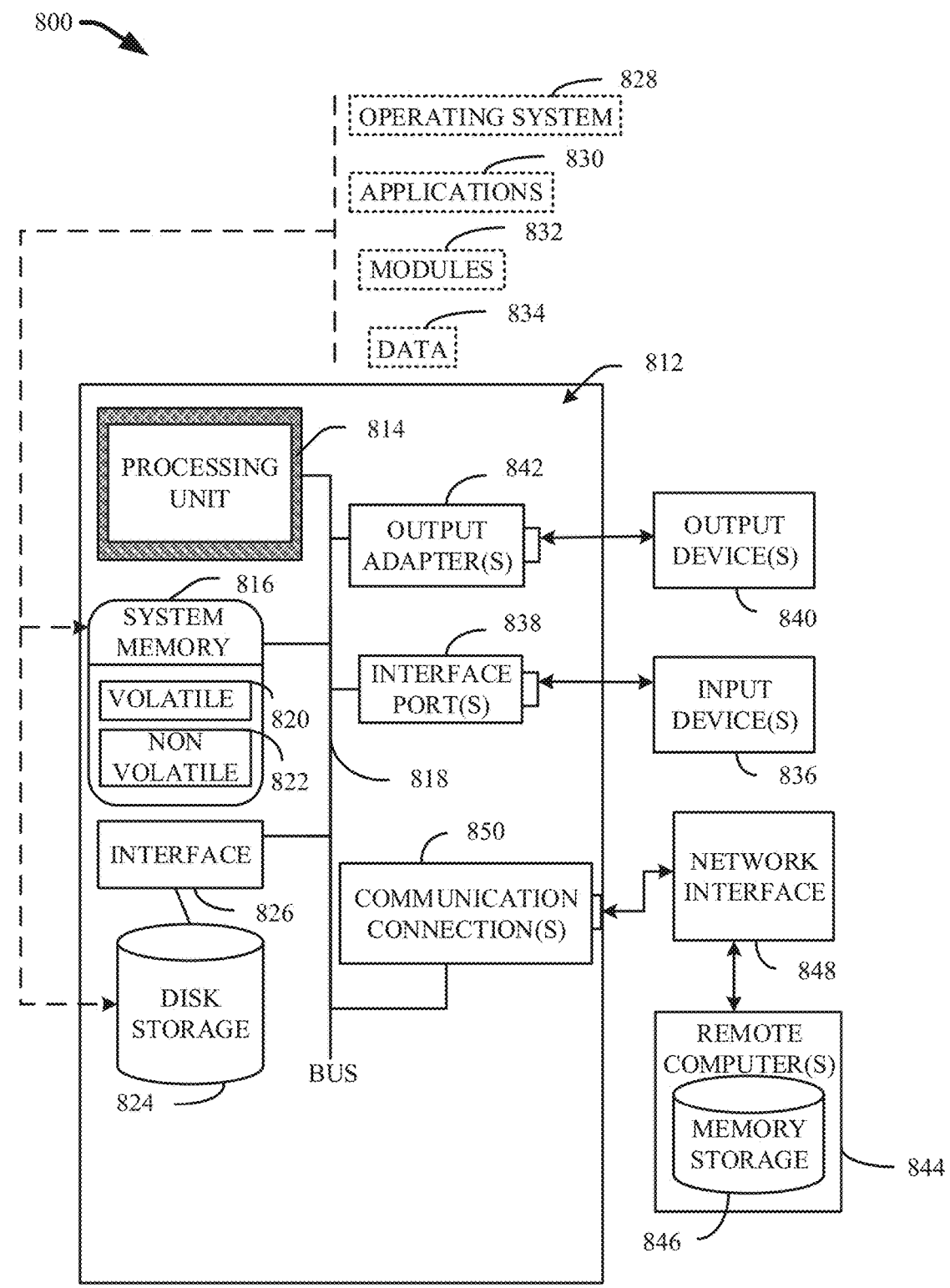
FIG. 8 is a schematic diagram of an example operating environment in accordance with one or more implementations described herein.

Turning to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1084), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components;
   a processor, operably coupled to the memory, and that executes the computer-executable components stored in the memory, wherein the computer-executable components comprise:
      a transformation component that receives a quantum program and automatically transforms the quantum program into one or more transformed quantum programs by introducing one or more mutations to lines of program code of the quantum program, wherein each transformed quantum program comprises a different mutation of the one or more mutations, and the lines of program code are in a quantum programming language;
      a testing component that tests the one or more transformed quantum programs on a quantum software development kit (SDK); and
      a reporting component that reports whether the quantum SDK has functioned properly or failed for respective transformed quantum programs of the one or more transformed quantum programs.

2. The system of claim 1, wherein the transformation component randomly generates the one or more mutations.

3. The system of claim 1, wherein the one or more mutations comprises inserting a line of code to the lines of program code of the quantum program.

4. The system of claim 1, wherein the one or more mutations comprises removing a line of code from the lines of program code of the quantum program.

5. The system of claim 1, wherein the one or more mutations comprises swapping two lines of code of the lines of program code of the quantum program.

6. The system of claim 1, wherein the one or more mutations comprises replacing a gate in a line of code of the lines of program code of the quantum program with a different gate.

7. The system of claim 1, wherein the one or more mutations comprises replacing qubits in a line of code of the lines of program code of the quantum program with different qubits.

8. A computer-implemented method, comprising:
receiving, by a device operatively coupled to a memory, a quantum program;
transforming, by the device, the quantum program into one or more transformed quantum programs by introducing one or more mutations to lines of program code of the quantum program, wherein each transformed quantum program comprises a different mutation of the one or more mutations, and the lines of program code are in a quantum programming language;
testing, by the device, the one or more transformed quantum programs on a quantum software development kit (SDK); and
reporting, by the device, whether the quantum SDK has functioned properly or failed for respective transformed quantum programs of the one or more transformed quantum programs.

9. The computer-implemented method of claim 8, further comprising randomly generating, by the device, the one or more mutations.

10. The computer-implemented method of claim 8, wherein the one or more mutations comprises inserting, by the device, a line of code to the lines of program code of the quantum program.

11. The computer-implemented method of claim 8, wherein the one or more mutations comprises removing, by the device, a line of code from the lines of program code of the quantum program.

12. The computer-implemented method of claim 8, wherein the one or more mutations comprises swapping, by the device, two lines of code of the lines of program code of the quantum program.

13. The computer-implemented method of claim 8, wherein the one or more mutations comprises replacing, by the device, a gate in a line of code of the lines of program code of the quantum program with a different gate.

14. The computer-implemented method of claim 8, wherein the one or more mutations comprises replacing, by the device, qubits in a line of code of the lines of program code of the quantum program with different qubits.

15. A computer program product that tests a quantum software development kit (SDK), comprising a computer readable storage medium having program instructions embodied therewith, the program instructions executable by a processor to cause the processor to:
receive, by the processor, a quantum program;
transform, by the processor, the quantum program into one or more transformed quantum programs by introducing one or more mutations to lines of program code of the quantum program, wherein each transformed quantum program comprises a different mutation of the one or more mutations, and the lines of program code are in a quantum programming language;
test, by the processor, the one or more transformed quantum programs on the quantum SDK; and
report, by the processor, whether the quantum SDK has functioned properly or failed for respective transformed quantum programs of the one or more transformed quantum.

16. The computer program product of claim 15, wherein the program instructions executable by the processor to cause the processor to randomly generate the one or more mutations.

17. The computer program product of claim 15, program wherein the one or more mutations comprises inserting a line of code to the lines of program code of the quantum program.

18. The computer program product of claim 15, wherein the one or more mutations comprises removing a line of code from the lines of program code of the quantum program.

19. The computer program product of claim 15, wherein the one or more mutations comprises swapping two lines of code of the lines of program code of the quantum program.

20. The computer program product of claim 15, wherein the one or more mutations comprises replacing a gate in a line of code of the lines of program code of the quantum program with a different gate.

* * * * *